United States Patent [19]
Wood, Jr. et al.

[11] Patent Number: 5,267,436
[45] Date of Patent: Dec. 7, 1993

[54] VECTORING NOZZLE CONTROL OF GAS TURBINE ENGINES

[75] Inventors: Coy B. Wood, Jr., Jupiter; Calvan G. DeFreese, Lake Park, both of Fla.

[73] Assignee: United Technologies Corporation, Hartford, Conn.

[21] Appl. No.: 951,999

[22] Filed: Sep. 28, 1992

[51] Int. Cl.$^5$ .............................................. F02K 1/00
[52] U.S. Cl. ........................................ 60/204; 60/232; 239/265.35; 244/52
[58] Field of Search ................. 60/204, 228, 232, 271; 239/265.19, 265.33, 265.35; 244/52

[56] References Cited

U.S. PATENT DOCUMENTS

| | | | |
|---|---|---|---|
| 3,237,890 | 3/1966 | Thielman | 60/232 |
| 3,258,915 | 7/1966 | Goldberg | 60/232 |
| 3,361,362 | 1/1968 | Edwards | 239/265.33 |
| 3,401,887 | 9/1968 | Sheppard | 60/232 |
| 3,726,480 | 4/1973 | Miltenberger | 60/232 |
| 3,747,342 | 7/1973 | Kapinos | 60/232 |
| 4,104,877 | 8/1978 | Bone et al. | 60/232 |

Primary Examiner—Louis J. Casaregola
Attorney, Agent, or Firm—Robert E. Greenstien

[57] ABSTRACT

Exhaust vectoring control for gas turbine engines having an exhaust nozzle mounted on a ring that is positionally controlled by a plurality of actuators in response to pitch and yaw commands uses signal processing to convert pitch and yaw signals into actuator extensions based upon stored coordinates identifying the location of each actuator connected to the ring in relation to the X, Y and Z reference axes of the engine. The computation of these coordinates takes into account the orientation of the ring. The largest actuator change is selected and limited to a stored maximum allowable change in extension for a fixed or set time interval, such as a signal processor cycle, thereby limiting actuator vector rate. The limited change is divided by the largest computed extension change, producing a ratio or factor that is multiplied by the computed changes for the other actuators, producing a set of actuator signals that are simultaneously applied to their respective actuators for the processor cycle.

7 Claims, 6 Drawing Sheets

VECTORING NOZZLE CONTROL OF GAS TURBINE ENGINES

TECHNICAL FIELD

This invention relates to gas turbine engines, specifically vectored exhaust nozzles for gas turbine engines that power aircraft.

BACKGROUND OF THE INVENTION

The state of the art in aircraft propulsion using gas turbine engines can embrace moveable exhaust nozzles, to provide "vectored" engine thrust, a technique that significantly enhances aircraft maneuverability. Typically, flight stick movements made by the pilot are translated into pitch and yaw thrust vector commands that are used to command nozzle movement. The response must be fast, reliable and accurate in terms of nozzle vector angle and vector rate. Vectoring nozzles are exposed to substantial forces and temperatures from the engine, adding complexity to the task of positioning them precisely.

Following one general design philosophy, the tips of divergent flaps on an exhaust nozzle are linked to a rigid ring and anchored to the convergent throat. The ring is positioned at longitudinal and polar orientations relative to the longitudinal axis of the engine. Ring positioning is accomplished by way of actuators, and commands, sent to each actuator, cause a change in actuator extension (i.e. cause the actuator to extend or retract).

By extending all the actuators an equal amount (longitudinal motion) the ratio of the divergent area to the convergent area is controlled, optimizing engine and aircraft performance. If only one actuator is extended, nozzle vector angle is controlled, producing a turning moment on the aircraft.

The reasons to establish that design philosophy are related to complexities when accurately locating the actuators and coordinating their motion. Inaccurate actuator control can produce uncommanded vector angles, creating undesirable forces on the aircraft. In certain nozzle/actuator configurations, mislocating actuators can induce high stresses on the ring, perhaps leading to a ring failure. This can happen when, because of a high load, the number of actuators is more than the minimum number needed simply to move the nozzle.

DISCLOSURE OF THE INVENTION

Among the objects of the present invention is providing improved exhaust vectoring control for gas turbine engines having an exhaust nozzle mounted on a ring that is positionally controlled by a plurality of actuators in response to pitch and yaw commands.

According to the present invention, actuator extension takes place incrementally, but the maximum rate of change is limited for each increment. Changes in each actuator extension are proportionalized relative to the other actuators in such a way that the extension of only one actuator is reduced to achieve that limit.

According to the invention, a control system is provided that uses a signal processor to convert pitch and yaw signals into actuator extensions based upon stored coordinates identifying the location of each actuator connected to the ring in relation to the X, Y and Z reference axes of the engine. The computation of these coordinates takes into account the orientation of the ring. Assuming that all of the actuators do not call for the same change in extension, the largest actuator change is selected and limited to a stored maximum allowable change in extension for a fixed or set time interval, such as a signal processor cycle, thereby limiting actuator vector rate. The limited change is divided by the largest computed extension change, producing a ratio or factor that is multiplied by the computed changes for the other actuators, producing a set of actuator signals that are simultaneously applied to their respective actuators for the processor cycle.

According to one aspect of the present invention, actuator extension for each interval is computed by finding the difference between commanded and actual nozzle pitch and yaw angles and converting the difference into vector coordinates for each actuator location.

There are numerous features to the present invention, among them, it coordinates movement of each actuator with the other actuators in a way that the nozzle follows a precise path between vector requests, not only preventing an unexpected application of forces to the aircraft but minimizing ring stress in configurations with a comparatively large number of actuators. Other objects, benefits and features will be apparent to one skilled in the art from the following.

BEST MODE FOR CARRYING OUT THE INVENTION

Figure 1:
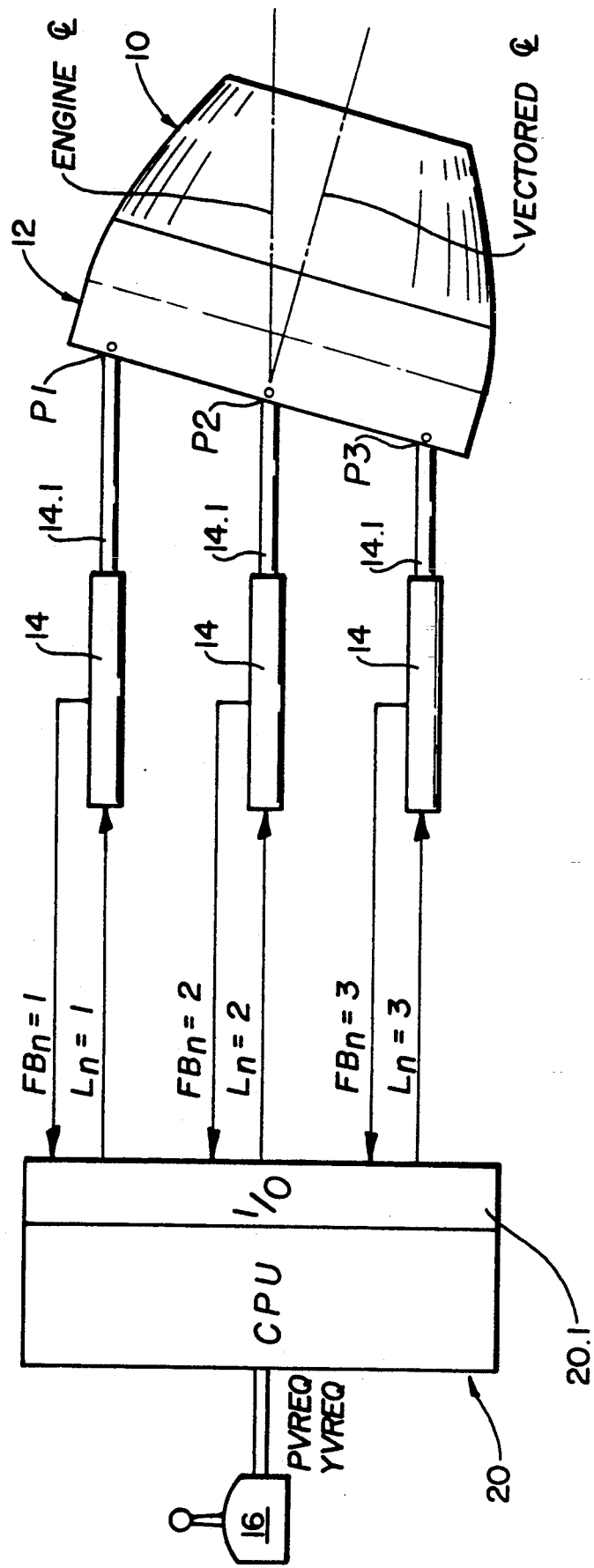
FIG. 1 is a simplified block diagram of a nozzle control system using a control ring and a plurality of actuators.
Figure 2:
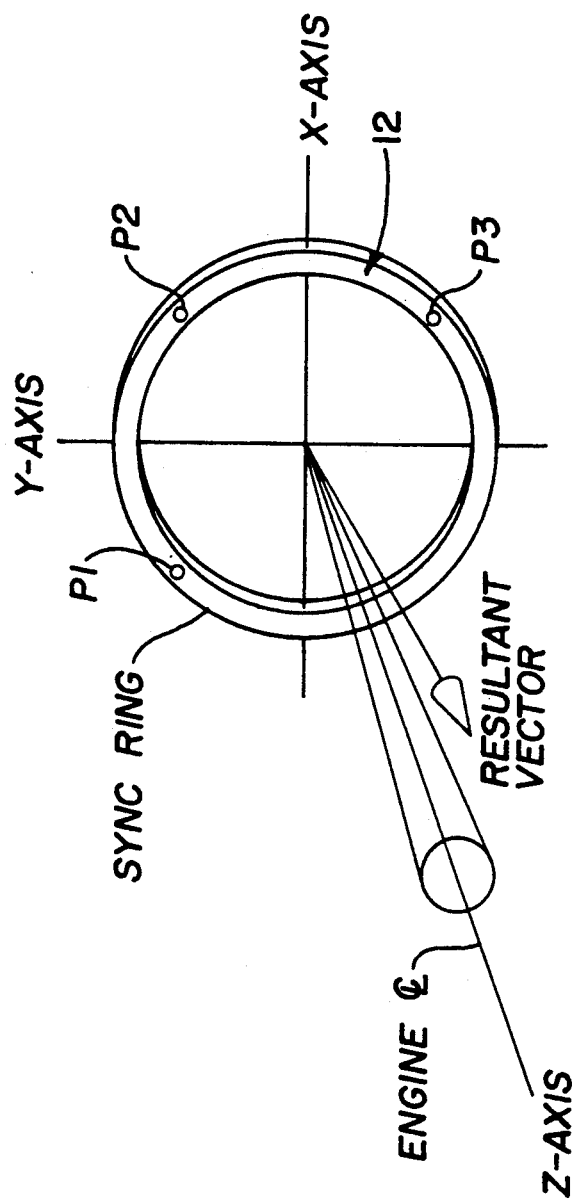
FIG. 2 is an isometric view of the control ring showing vector and polar coordinates.
Figure 3A:
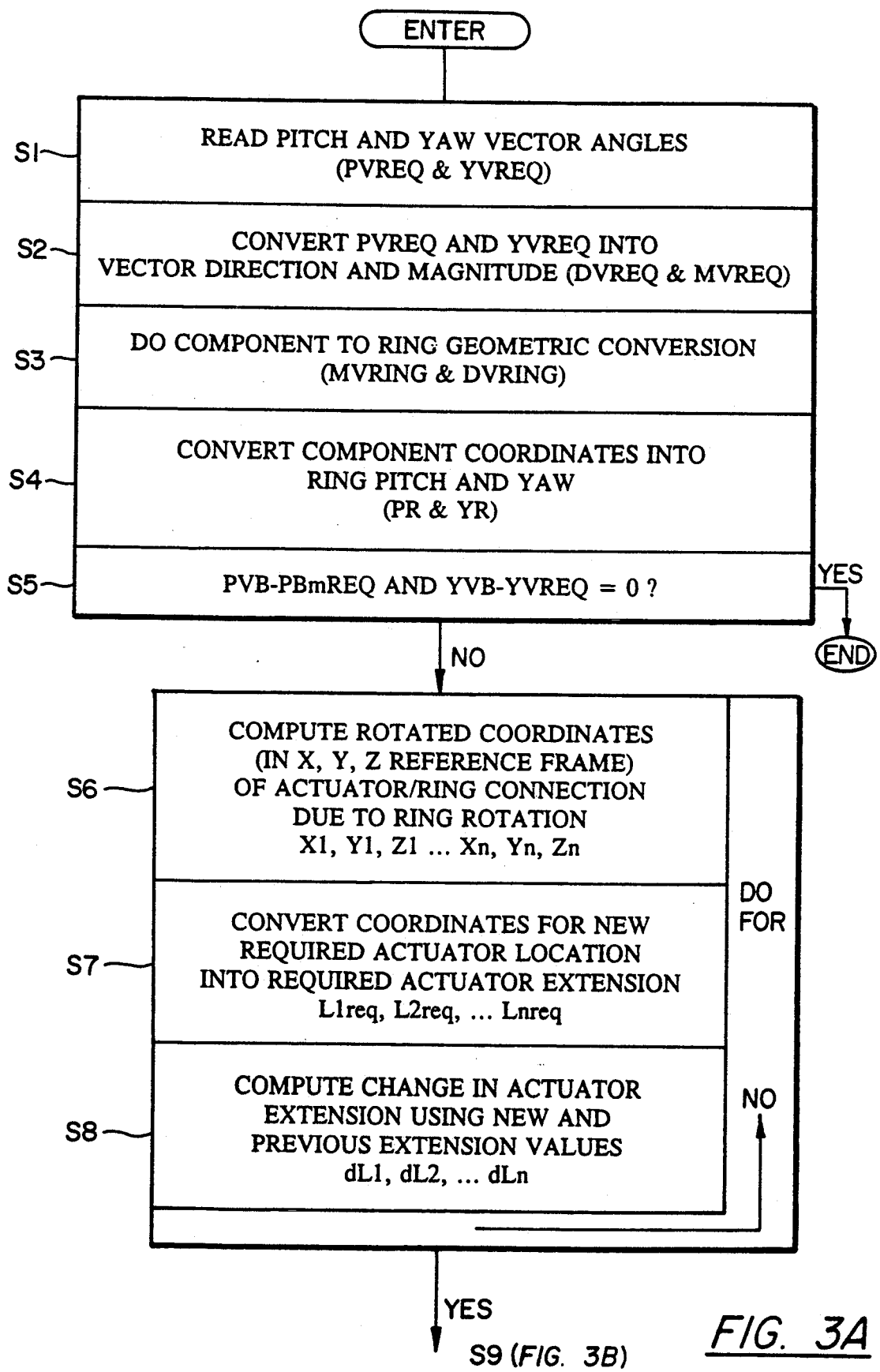
FIG. 3 is a flow chart describing signal processing steps carried out by a signal processor, shown in FIG. 1, to implement the present invention.
Figure 3B:
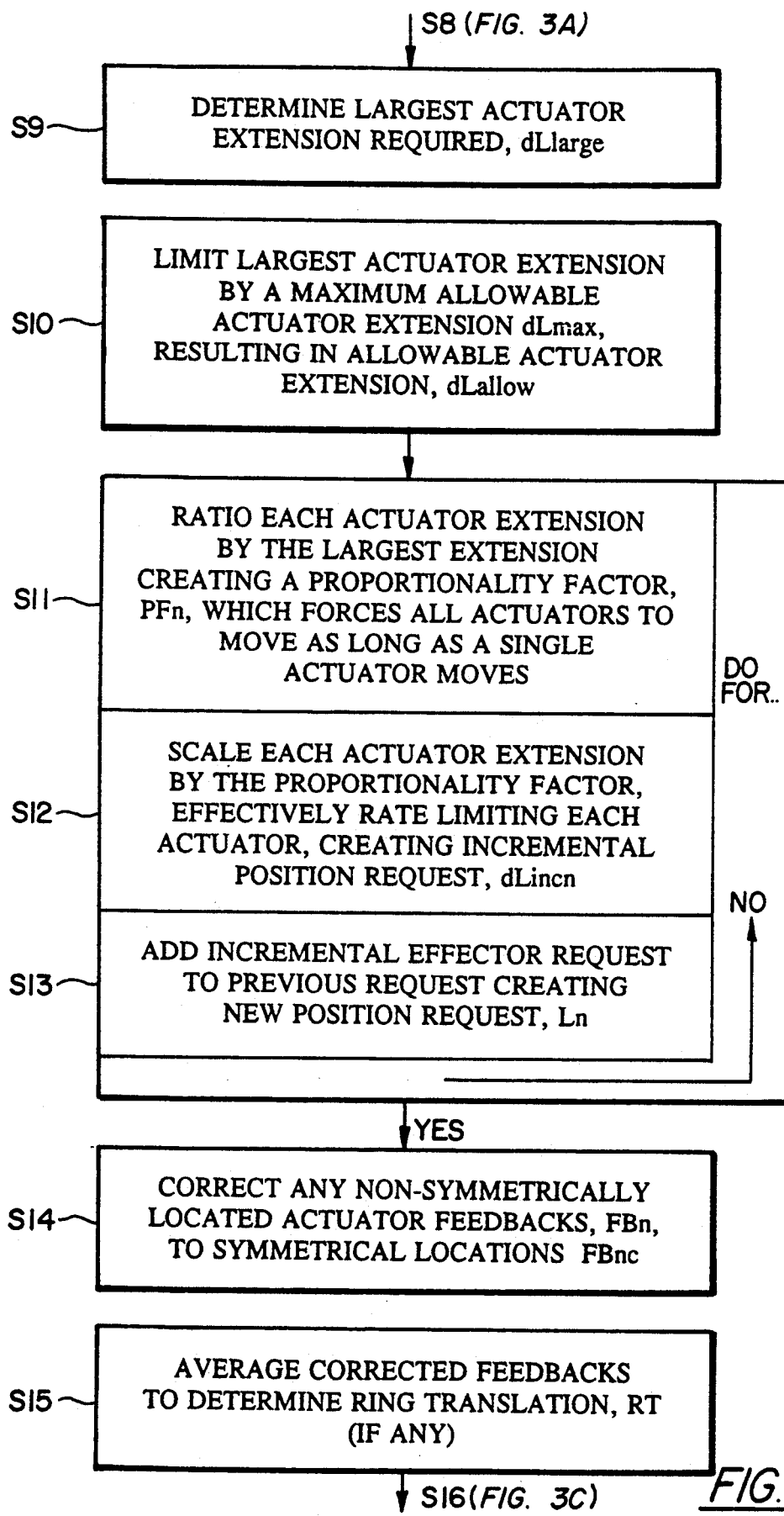
Figure 3C:
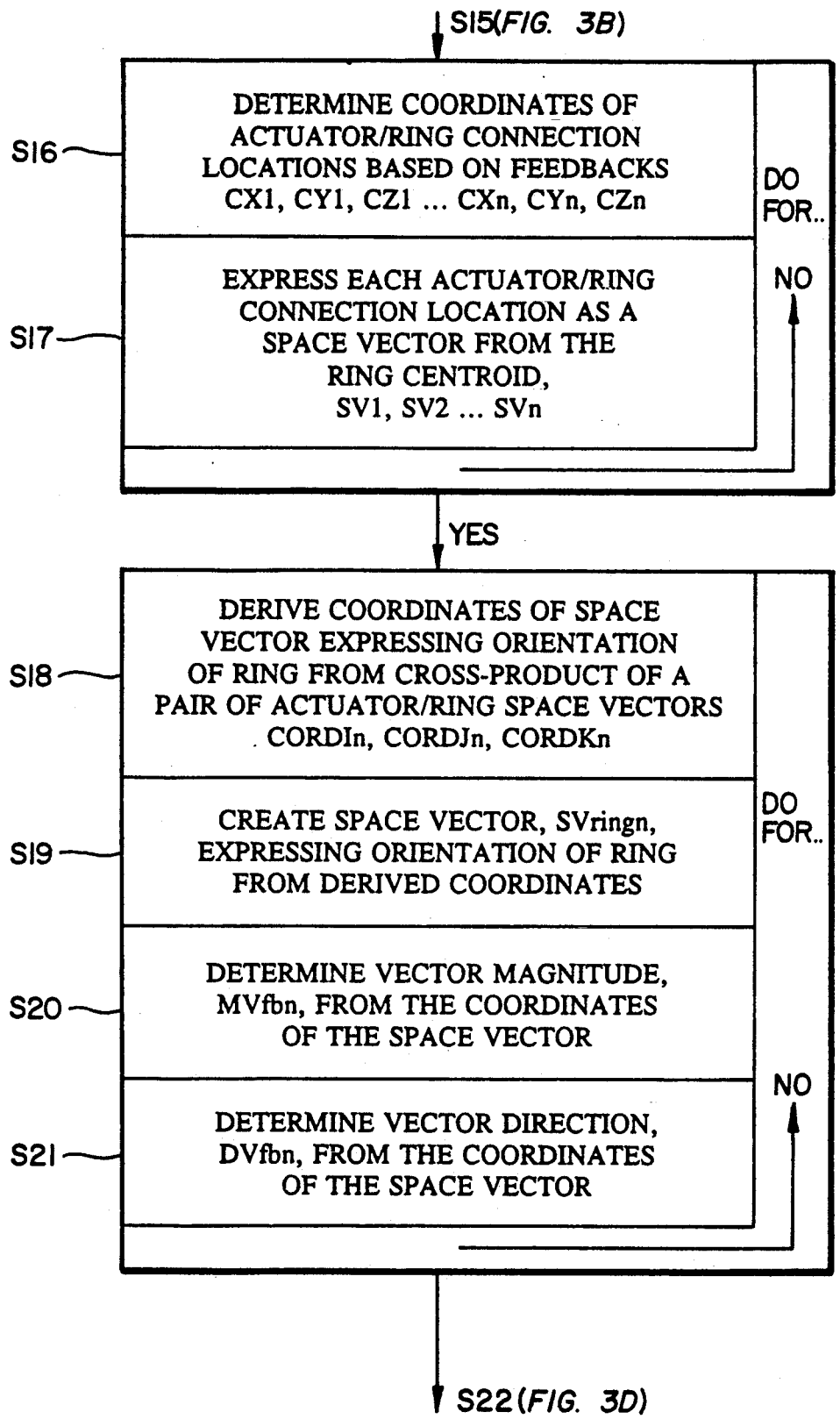
Figure 3D:
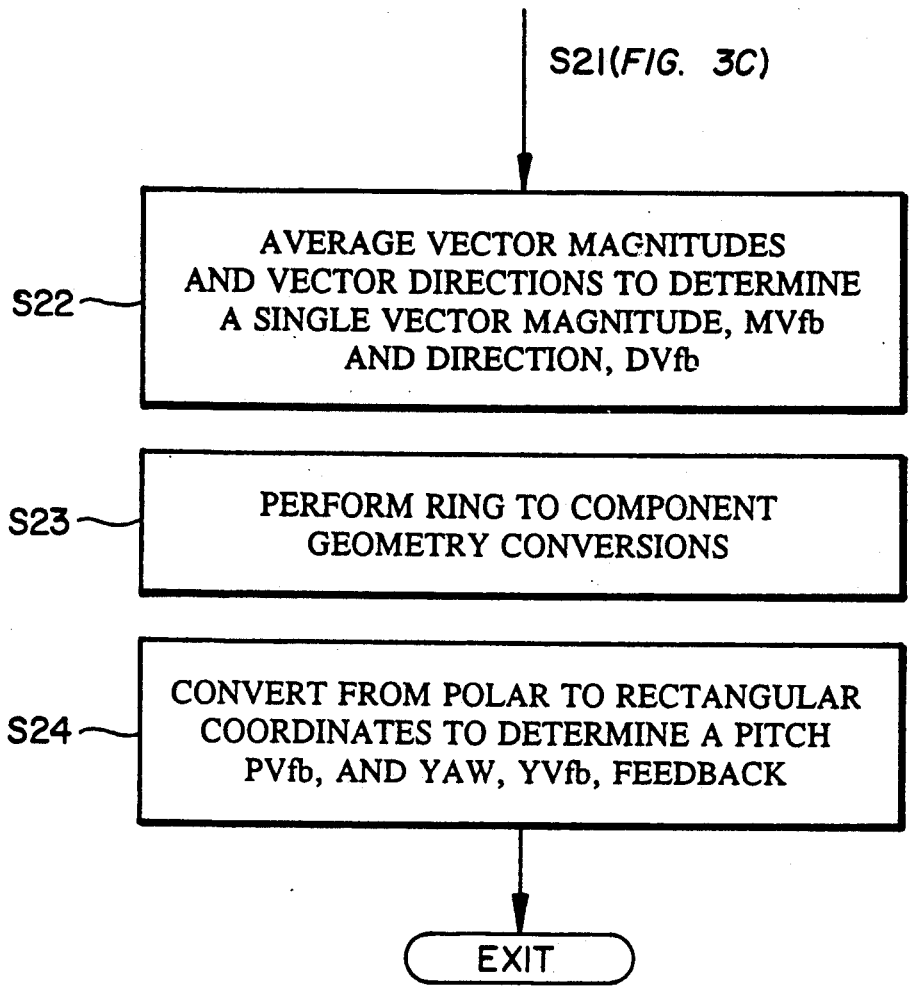

Referring to FIG. 1, an exhaust nozzle 10 is mounted on a ring 12 and the orientation of the ring, thereby the nozzle is controlled by three actuators 14 with extension rods 14.1 or pistons connected to the ring at locations P1, P2, P3. For simplicity, the engine is not shown, but it may be assumed that one end 14.2 of each actuator is attached to the engine. Extension or retraction of the actuators takes place in response to pitch and yaw signals PVREQ, YVREQ from a pitch and yaw control 16. These signals ultimately cause the ring, and thereby the nozzle, to rotate up and down and rotate from side to side (i.e. change yaw). Responding to signals PVREQ and YVREQ, which specify pitch and yaw in degrees, a signal processor 20 provides a signal Ln (n=actuator number, e.g. 1, 2, 3) to each of the actuators through input/output section 20.1. Signal Ln is computed (as discussed below) to provide specific change in extension of each rod 14.1. As explained below, this change takes place incrementally during each processor cycle. Rod extension is sensed by the actuator using known techniques, producing feedback signal FBn, these signals manifesting the change in extension of each extension rod 14.1 and being applied to the signal processor through the input/output section 20.1. FIG. 2 shows the locations P1, P2 and P3, and, for the moment, it should be appreciated that the invention embraces a "forward solution" translating pitch and yaw for the nozzle (the component or COMP) into a result vector for the ring, from that vector computing a vector for each position P1, P2 and P3, the magnitude of which manifests a change in actuator extensions or how much each actuator must retract or extend, in combination with the other actuators, to orient the ring in the direction of the resultant vector. Furthermore, the application of the invention also embraces a "reverse solution" centering on processing feedback signals PYFB and YVFB into pitch and yaw coordinates for the ring, thereby the nozzle, for comparison to signals PVREQ and YVREQ to drive an error signal used for determining actuator extension with the forward solution for the next processor interval.

These sequences will be better understood from the flow chart in FIG. 3. In FIG. 3, the forward solution starts at step S1, where the signals PVREQ and YVREQ are read by the processor. In the next step S2, those signals are converted into vector direction magnitude signals DVREQ and MVREQ, which manifest the conversion of the pitch and yaw vector commands into nozzle vector magnitude and direction commands by way of a rectangular tri-polar mathematical conversion expressed in the following equations (1 and 2).

$$MVREQ = (PVREQ^2 + YVREQ^2)^{0.5} \quad (1)$$

$$DVREQ = \arctan(PVREQ/YVREQ) \quad (2)$$

The third step S3, in an optional step. Here using the relationships called out in equations (3) and (4), a first pair of signals DVREQ and MVREQ is produced that represent the conversion of the nozzle vector magnitude and direction commands into a ring magnitude and direction commands by way of geometrical equations that define the relationship of nozzle (the component) position and ring position. This step would be used when there is not a one-to-one relationship between ring pitch and yaw and commanded thrust pitch and yaw, for instance when "divergent" nozzle flaps are used. A one-to-one relationship is assumed for this discussion.

$$MVRING = f(\text{Component Geometry, MVREQ}) \quad (3)$$

$$DVRING = f(\text{Component Geometry, DVREQ}) \quad (4)$$

In step S4, signals PR and YR are produced, and these signals represent a conversion of the ring vector magnitude and direction commands into ring pitch and ring yaw vector commands by way of a polar to rectangular mathematical conversion, expressed by the following equations (5 and 6).

$$PR = (MVRING) \cdot \cos(DVRING) \quad (5)$$

$$YR = (MVRING) \cdot \sin(DVRING) \quad (6)$$

The next step S5 compares ring pitch and ring yaw with the actual change in ring pitch and ring yaw that has taken place during the previous computation interval (processor period), and, unless the difference is zero, the process continues to step S6. In the next step S6, a process is begun to actually compute the change in actuator extension using new and previous extension values. This is done for each of the actuators. Specifically, in step S6, a set of signals (comprising one signal for each actuator) is generated by a conversion of the ring vector magnitude and direction command (produced in the previous step) into corresponding required actuator/ring mechanical interface locations. These are computed from stored coordinates X0, Y0, Z0, defining the unrotated locations of the connection points of each of the n actuators is relation to X, Y and Z axes on the static engine structure. These coordinates, however, are multiplied by a mathematical position transformation matrix, converting the unrotated/ring connection locations to actuator ring interface locations Xn, Yn, Zn. Equation 7 is used in this step.

$$\begin{bmatrix} Xn \\ Yn \\ Zn \end{bmatrix} = \begin{bmatrix} \cos PR & 0 & \sin PR \\ 0 & 1 & 0 \\ -\sin PR & 0 & \cos PR \end{bmatrix} \begin{bmatrix} 1 & 0 & 0 \\ 0 & \cos YR & -\sin YR \\ 0 & \sin YR & \cos YR \end{bmatrix} \begin{bmatrix} X0 \\ Y0 \\ Z0 \end{bmatrix} \quad (7)$$

In step S7, a set of signals is produced that represent the conversion of the rotated actuator/ring interface coordinates (for each actuator) into a required actuator position. This is done by way of the Pythagorean relationship, using stored reference coordinates XSTATIC, YSTATIC, ZSTATIC that define the location of the mounting connection for each actuator on the engine. Equation (8) defines the required actuator position.

$$LNREQn = [(Xn - XSTATIC)^2 + (Yn - YSTATIC)^2 + (Zn - ZSTATIC)^2]^{0.5} \quad (8)$$

The next step S8 produces signals (for each actuator) that represent the required change Dln in actuator extension, computed from the difference between the required or commanded actuator extension (based on PR and YR) and a stored value for each actuator position from the immediately previous signal processor computation cycle. Essentially, this process compares the present actuator position, derived from the previous cycle with what the extension position would be in the next cycle for the ring to be at an orientation corresponding to the instantaneous reading of PVREQ and YVREQ. The change in actuator extension DLn, is determined using the following equation (9), where LREQn and FBn are respectively the required extension and the extension determined from feedback devices in each actuator. Steps S6–S8 continue until DLn is computed for each actuator.

$$DLn = LnREQ - FBn \quad (9)$$

In the next step S9, the actuator having the largest extension change or required change DLLARGE is computed using a selection process from the computed extension for all the actuators. In the next step S10, a computation is made to limit the largest actuator extension to an allowable actuator extension, DLALLOW. In the next step S11, a signal is produced comprising a proportionality factor for each actuator. The proportionality factor is the ratio of the allowable change in each actuator extension to the requested extension for each actuator. PFn, the proportionality factor, is DLN/DLallow. Using PFn, the next step S12 scales each actuator extension by PFn using the equation DLINC = DLn·PFn, where DLINC is the incremental change in position request for the actuator (an extension change for the next time increment or interval, defined by the processor cycle). In the next step S13, the incremental actuator extension DLINC is added to the previous extension FBn, producing the new position request Ln. Steps S11, S12 and S13 are repeated for each actuator, until Ln is produced for each actuator. Signal Ln is provided by the signal processor to each of the actuators, causing the actuator to move, but in a single time interval or increment, e.g. one processor computation interval, to a new position Ln. In this way, the actuators essentially move the ring to the pitch and yaw of PV and YV, but in every increment the movement (hence ring stress) is limited to Dallow.

An optional step may follow step 13. If the nozzle divergent-to-convergent area ratio is actively controlled, each of the actuators must be extended an equal distance, in addition to any extension for vectoring. The amount of extension needed to produce a specific area ratio is determined from a stored label relating the two quantities (extension to area ratio). If the nozzle is operated only for vectoring, this step may be omitted and that may be assumed here.

At the next step, the inverse solution begins, again, a process that produces feedback signals that are used in the forward solution (described in the previous steps). Step S14, also an optional step, accommodates asymmetrical actuator locations. The inverse solution assumes that every actuator is symmetrically connected along the circumference of the ring. With step S14, actuator extension feedback signals for asymmetrically located actuators are corrected, using established geometric conversions, to symmetrical locations using stored factors (based on those relationships) resulting in corrected actuator feedbacks FBCn. This discussion, however, assumes a symmetrical location for simplicity.

At step S15, the average of the corrected actuator feedbacks is computed. This locates the center of the ring, the point around which all rotations take place. The ring center may be translated for two reasons, for nozzle divergent-to-convergent area ratio control; for ring mispositioning. Computing the ring center translation RT permits vectoring computations around the real center of ring rotation. Optionally, area ratio can be determined from a stored table (e.g. look-table) defining the relationship of ring center extension to area ratio.

The next step S16 determines the coordinates of each of the actuator/ring connections. These locations, which are based on feedback signals CX1, CY1, CZ1, are computed with the following equations (10, 11, and 12) where radius and angle are constant.

$$CXn = RADIUS \cdot cos(ANGLEFROMREF) \quad (10)$$

$$CYn = RADIUS \cdot sin(ANGLEFROMREF) \quad (11)$$

$$CZn = RT - FBCn \quad (12)$$

In the next step S17, each actuator ring connection location is expressed as a space vector referenced relative to the center of the ring. Each space vector SVn is established with this equation (13).

$$SVn = CXni + CYnj + CZnk \quad (13)$$

The steps for determining the space vector SVn are repeated for each actuator, and once completed, the process goes to the next step S18, where the coordinates of a single space vector expressing orientation in the ring is determined from the cross-product of any pair of actuator/ring spaced vectors using equation (14) below, which produces a determinant from the vector cross-product. It should be considered that a pair of actuators is used to identify the ring plane and that it is assumed that ring translation RT is zero, meaning that CZn therefore equals the feedback in equation 12.

$$V1 \times V2 = \begin{vmatrix} i & j & k \\ CX1 & CY1 & CZ1 \\ CX2 & CY2 & CZ2 \end{vmatrix} \quad (14)$$

The results from the cross-product operation are three coordinates CORDIn, CORDJn and CORDKn for each actuator position. Then, in the next step S19, which uses equation (15), a space vector SVRINGn for the ring orientation is derived from each set of space vector coordinates for the actuator pair.

$$SVRINGn = CORDIn\, i + CORDJn\, j + CORDKn\, k \quad (15)$$

The magnitude of each ring vector MVFBn is determined from the coordinates of the space vector SVRINGn using the following equation (16) at step S20.

$$MVfbn = \arccos\left( \frac{CORDKn}{(CORDIn^2 + CORDJn^2 + CORDKn^2)^5} \right) \quad (16)$$

Then, in the next step S21, the vector direction DVFBN is determined from the space vector SVRINGn using the following geometric relationship.

$$DVFBn = \arctan(CORDJn/CORDIn) \quad (17)$$

In the next step S22, the magnitudes and directions of all the vectors are averaged to determine a single vector magnitude MVB and direction DVFB for the ring. This is done using the following equation.

$$MVFB = (MVFB1 + MVFB2 + \ldots MVFBn)/n \quad (18)$$

$$DVFB = (DVFB1 + DVFB2 + \ldots DVFBn)/n \quad (19)$$

Then in the next step S23, another optional step, a ring-to-component (nozzle) geometry conversion is made with these equations, again assumed here to be a one-to-one relationship (see step S3).

$$MVCOMP = f(\text{Component Geometry}, MVFB) \quad (20)$$

$$DVCOMP = f(\text{Component Geometry}, DVFB) \quad (21)$$

At the next step S24, the vector magnitude and direction feedbacks for the nozzle are converted into pitch and vector yaw feedback signals PVFB, YVFB by way of the following polar to rectangular mathematical conversion in equations (22 and 23).

$$PVFB = MVCOMP \cdot cos(DVCOMP) \quad (22)$$

$$YVFB = MVCOMP \cdot sin(DVCOMP) \quad (23)$$

These signals are compared with PV and YV to determine the difference (error) between commanded nozzle pitch and yaw and actual nozzle pitch and yaw (at the end of one interval).

The foregoing is a description for carrying out the invention and will enable one skilled in the art to make modifications in whole or in part to the invention without departing from the true scope and spirit of the invention set forth in the claims that follow.

We claim:

1. An aircraft gas turbine engine exhaust nozzle control, comprising an exhaust nozzle supported on a control ring, a plurality of actuators connected to the ring and anchored to the engine, a pitch and yaw control and a signal processor that responds to pitch and yaw signals in angular dimensions from the pitch and yaw control to position the nozzle in an orientation relative to X, Y, Z axes of the engine, characterized by:

said signal processor comprising means for providing, in response to said pitch and yaw signals, a first signal, for each actuator, comprising computed requested changes in actuator extension based upon said pitch and yaw signals and stored coordinates identifying the location of the connection of the actuator on the ring on said X, Y and Z axes at the beginning of a first of successive time intervals; for providing, in response to said first signal, a second signal that represents a change in extension of a first of the actuators that is the largest change in extension of all the actuators at the beginning of said time interval; for providing, in response to said second signal, a third signal that represents a permissible change in the extension of said first actuator for the duration of said time interval; for providing, in response to said second and third signals, a fourth signal that manifests a ratio computed by dividing said permissible change by said greatest change; for providing, in response to said fourth signal and said first signal; a first set of signals in which each signal manifests the product of said computed actuator extension multiplied by said ratio; and for providing each signal in said set to an actuator for said time interval.

2. A gas turbine nozzle control according to claim 1, further characterized in that said signal processing means comprises means for computing the extension of each actuator based upon the difference between nozzle pitch and yaw at the end of said time interval and nozzle pitch and yaw identified by said pitch and yaw signals.

3. A gas turbine engine nozzle control according to claim 2, further characterized in that said signal processing means comprises means for providing signals that manifest the magnitude and direction of at least two vectors associated with actuator connection points on the ring, said vectors identifying pitch and yaw of each point, for multiplying said vectors using said signals to produce a signal manifesting the magnitude and direction of a vector identifying the pitch and yaw of the ring.

4. A gas turbine engine nozzle control according to claim 3, further characterized in that said signal processing means comprises means for providing a signal indicative of ring translation, longitudinal translation in an engine longitudinal axis, said signal manifesting an average of changes in extension magnitude of the actuators at the end of said time interval.

5. A gas turbine engine nozzle control according to claim 4, further characterized in that said signal processing means comprises means providing, at the end of each time interval, an actuator vector for each actuator, said vector having a magnitude and direction indication of actuator extension and direction, providing a DVFB signal comprising the average direction of said actuator vectors, an MVFB signal comprising the average of the magnitude of said actuator vectors and providing a PVFB and YVFB feedback indicative of nozzle pitch and yaw derived from the equation PVFB=MVCOMP·COS(DVCOMP), YVFB=MVCOMP·SIN(DVCOMP).

6. A method for controlling an aircraft gas turbine exhaust nozzle supported on a control ring connected to a plurality of actuators connected to the ring, a pitch and yaw control and a signal processor that responds to signals from the pitch an yaw control to operate the actuators to position the nozzle center line in a vector orientation on X, Y, Z axes along a center line of the engine, characterized by the steps of:

translating the control signals into space vectors at the connection point of an actuator to the ring, said space vectors representing the direction and magnitude of change in actuator extension from said change;

determining the actuator with the maximum change in extension from said translating step;

producing a first actuator extension signal by reducing said actuator change in extension to a first magnitude for a set time interval, said first magnitude being a stored value applicable to all actuators;

producing additional actuator extension signals for actuators other than said first actuator by scaling the change in extension of other actuators in proportion to the ratio of said first magnitude to said maximum change in extension;

applying said first actuator extension signal and said additional actuator extension signals simultaneously to corresponding actuators for said time interval.

7. A method according to claim 6, further characterized by the step:

producing said pitch and yaw signal as the difference between a commanded pitch and yaw for the nozzle and the pitch and yaw for the nozzle at the end of a preceding one of successive time intervals equaling said time interval.

* * * * *